United States Patent [19]

Bock et al.

[11] Patent Number: 5,300,600
[45] Date of Patent: Apr. 5, 1994

[54] AQUEOUS DISPERSIONS OF PEROXIDES

[75] Inventors: Lawrence A. Bock, Walnut Creek; Ronald L. Pastorino, San Anselmo, both of Calif.; Douglas Nordhaus, Houstin, Tex.

[73] Assignee: Witco Corporation, New York, N.Y.

[21] Appl. No.: 881,304

[22] Filed: May 7, 1992

Related U.S. Application Data

[63] Continuation of Ser. No. 420,568, Oct. 12, 1989, abandoned.

[51] Int. Cl.$^5$ .............................. C08F 4/34; C08F 2/00; C09K 3/00
[52] U.S. Cl. ..................................... 526/202; 526/208; 526/230.5; 526/232.1; 526/932; 252/186.42; 106/287.23; 524/384
[58] Field of Search .................. 526/208, 230.5, 232.1, 526/932, 202; 252/186.42; 106/287.23; 524/339, 384

[56] References Cited

U.S. PATENT DOCUMENTS

| | | | |
|---|---|---|---|
| 3,182,026 | 5/1965 | Leveskis | 252/430 |
| 3,244,770 | 4/1966 | Kirkpatrick et al. | 560/198 |
| 3,507,800 | 4/1970 | Leveskis | 252/186 |
| 3,535,422 | 10/1970 | Cox | 424/164 |
| 3,825,509 | 7/1974 | Miller | 260/86.3 |
| 3,988,261 | 10/1976 | Barter et al. | 252/431 C |
| 4,039,475 | 8/1977 | Oosterwijk et al. | 252/431 R |
| 4,056,611 | 11/1977 | Young | 424/62 |
| 4,092,470 | 5/1978 | Oosterwijk et al. | 526/227 |
| 4,105,584 | 8/1978 | Norback et al. | 252/426 |
| 4,189,501 | 2/1980 | Fulton, Jr. | 424/338 |
| 4,255,277 | 3/1981 | Smearing | 252/186 |
| 4,350,681 | 9/1982 | Fulton, Jr. | 424/53 |
| 4,355,028 | 10/1982 | Kligman et al. | 424/230 |
| 4,374,057 | 2/1983 | Goodman et al. | 252/426 |
| 4,376,719 | 3/1983 | Goodman et al. | 252/426 |
| 4,377,498 | 3/1983 | Temple | 252/431 C |
| 4,387,107 | 6/1983 | Klein et al. | 424/338 |
| 4,415,716 | 11/1983 | Lundin et al. | 526/209 |
| 4,440,885 | 4/1984 | Tamosauskas | 524/57 |
| 4,483,784 | 11/1984 | Temple | 523/203 |
| 4,499,250 | 2/1985 | Lundin et al. | 526/209 |
| 4,515,929 | 5/1985 | Tang | 526/228 |
| 4,545,990 | 10/1985 | Le Foyer de Costil et al. | 514/557 |
| 4,547,481 | 10/1985 | Lundin et al. | 502/160 |
| 4,552,682 | 11/1985 | Black et al. | 252/186.26 |
| 4,692,427 | 9/1987 | Pastorino et al. | 502/160 |
| 4,734,135 | 3/1986 | Satomi et al. | 106/287.23 |

Primary Examiner—Paul R. Michl
Assistant Examiner—Tae H. Yoon
Attorney, Agent, or Firm—Lockwood, Alex, FitzGibbon & Cummings

[57] ABSTRACT

Disclosed are high concentration aqueous dispersions of normally solid organic peroxides using a dispersion agent comprising an alkylaryl polyether alcohol and an oxyalkylated phenolic resin. Optional components such as thickening agents, anionic emulsifiers and a partial ester of a carboxylic acid copolymer may also be included. Dispersions having concentrations of up to about 65% weight percent organic peroxide can be prepared. Dispersions having concentrations of up to about 40 weight percent organic peroxide are sprayable. Also disclosed are the curing of polyester resins and the suspension polymerization of vinyl monomers using these dispersions.

22 Claims, No Drawings ific equipment for handling would be even more desirable to provide a pumpable product which can be shipped and forwarded directly from on-sight storage to the polymerization vessel.

AQUEOUS DISPERSIONS OF PEROXIDES

This application is a continuation of application Ser. No. 420,568, filed Oct. 12, 1989, now abandoned.

BACKGROUND OF THE INVENTION

This invention relates to aqueous dispersions of peroxides useful in the curing of polyester resins and the suspension polymerization of vinyl monomers. In particular this invention relates to storage stable dispersions of normally solid organic peroxides which can contain high concentrations of the peroxide and are preferably sprayable and pumpable so as to make their use as initiators in the curing of unsaturated polyester resins and in the suspension polymerization of vinyl monomers more easily accomplished.

Peroxides have, as a general property, a tendency to be flammable and explosive with some peroxides exhibiting such properties to a greater extent than others. For example, benzoyl peroxide may decompose when dry due to shock, friction, or static electricity. This property carries with it the obvious hazards to the users of these materials as well as to the manufacturers and intermediate handlers thereof. One particularly burdensome aspect of this property occurs during shipment of the peroxides. Accordingly, it has long been an object to provide flame resistant organic peroxide compositions. For example, U.S. Pat. No. 3,507,800 is directed to providing a flame resistant peroxide composition consisting essentially of three components—water, peroxide and solvent wherein the water is at least about 18 percent of the composition.

The safety and end-use advantage provided by a water-soluble or a water emulsifiable initiator is well recognized. In this regard, U.S. Pat. No. 3,825,509 describes a process for the suspension polymerization of vinyl chloride wherein the initiator is an aqueous emulsion of an organic peroxide in which the peroxide is present in an amount up to 19 weight percent. The surfactant used to prepare the aqueous peroxide emulsion is a combination of polyvinyl alcohol and polyoxyethylene sorbitan monolaurate. However, emulsions containing greater than about 19 percent by weight of organic peroxide are described as being too viscous and therefore difficult to handle.

Providing an aqueous emulsion of a highly reactive organic peroxide, in and of itself, is not a guarantee of a safe product, as phase separation can result in a concentrated mass of undiluted organic peroxide. Decomposition of such an undiluted mass of organic peroxide, depending on such things as the total mass, container, temperature of decomposition, etc., can result in a decomposition that is accompanied by the liberation of heat and flammable gasses. Such conditions can lead to fires, deflagrations, pressure ruptures and detonations. Further, irrespective of any hazards, phase separation of the initiator emulsion can result in nonuniform concentrations of the initiator being supplied to the polymerization system. Efforts to provide a stable aqueous dispersion of organic peroxide include U.S. Pat. No. 3,988,261 which is directed to frozen aqueous emulsions of organic peroxides having a moderate to high concentration of organic peroxides. It has been suggested that such emulsions can be frozen without separation of the organic peroxide phase and water phase and, when thawed, retain their emulsified state at least for a period of time sufficient to allow safe handling and use. Although the frozen emulsified peroxide compositions of U.S. Pat. No. 3,988,261 may provide advantages for the handling of highly reactive peroxides, it is necessary for the end-user to provide special equipment for handling would be even more desirable to provide a pumpable product which can be shipped and forwarded directly from on-sight storage to the polymerization vessel.

There have been attempts in the past to make such dispersions. U.S. Pat. Nos. 4,039,475 and 4,092,470 disclose stable, pumpable aqueous suspensions of organic peroxides using a mixture of a) nonionic emulsifiers having a maximum HLB value of 12.5 and b) nonionic emulsifiers having a minimum HLB value of 12.5 or anionic emulsifiers. U.S. Pat. No. 4,734,135 discloses aqueous suspensions of solid organic peroxides using a protective colloid, a surface active agent and water. U.S. Pat. No. 4,440,885 teaches emulsions of a solid organic peroxide using an emulsifier having an HLB value from about 9 to about 20, hydrocarbon solvent and water.

Numerous other dispersions of solid organic peroxides are to be found in the art. Yet there is still a need for aqueous dispersions containing high concentrations of solid organic peroxides that are storage stable and preferably sprayable or pumpable.

It is therefore an object of the present invention to provide stable aqueous dispersions of normally solid organic peroxides.

Another object of the present invention is to provide high concentration dispersions of normally solid organic peroxides.

Also an object of the present invention is to provide dispersions of normally solid organic peroxides by the use of readily available components and equipment.

Another object of the present invention is the provision of dispersions of normally solid organic peroxides useful for the suspension polymerization of vinyl monomers.

Also an object of the present invention is the provision of dispersions of normally solid organic peroxides useful for curing polyester resin.

Still another object of the present invention is to provide sprayable or pumpable high concentration peroxide dispersions.

Other objects will become apparent from the following description.

SUMMARY OF THE INVENTION

The present aqueous dispersions comprise from about 10 to about 65 percent by weight of an organic peroxide which is solid at about 20° C. ("normally solid"); an effective dispersing amount of a dispersing agent comprising an alkylaryl polyether alcohol and an oxyalkylated phenolic resin and water. The aqueous dispersions can also contain optional components such as thickening agents, anionic emulsifiers and a partial ester of a carboxylic acid copolymer.

DETAILED DESCRIPTION OF THE INVENTION

Aqueous dispersions of the present invention comprise an organic peroxide which is solid at about 20° C. Exemplary of such peroxides are aromatic diacyl peroxides, such as benzoyl peroxide, o-methylbenzoyl peroxide, o-methoxybenzoyl peroxide, o-ethoxy benzoyl peroxide, o-chlorobenzoyl peroxide and 2,4-dichlorobenzoyl peroxide; aliphatic diacyl peroxides, such as decanoyl peroxide, lauroyl peroxide and myristoyl peroxide;

ketone peroxides, such as 1-hydroxy cyclohexyl peroxide and 1-hydroperoxycyclohexyl peroxide; aldehyde peroxides such as 1-hydroxy heptyl peroxide; peroxy dicarbonates such as dicetyl peroxydicarbonate, di(4-t-butylcyclohexyl) peroxydicarbonate and acylperoxy alkylcarbonates, such as acetyl peroxy stearyl carbonate and the like.

The present aqueous dispersions can comprise from about 10 to about 65 percent by weight of the organic peroxide. One of the features of the present invention is that it enables the preparation of aqueous dispersions containing about 40 or more percent by weight of organic peroxide. Heretofore it has been difficult to make stable sprayable dispersions containing about 40 or more percent by weight organic peroxide. Being sprayable in this description means material having a viscosity of less than about 1,000 centipoises (CPS).

The dispersing agent of the present aqueous dispersions comprises a minimum of two components: 1) an alkyl aryl polyether alcohol; 2) an oxyalkylated phenolic resin.

Preferably the alkylaryl polyether alcohol has the following structural formula:

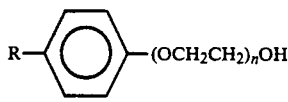

wherein R is alkyl from about 6 to about 12 carbon atoms and n is a number from 1 to about 12.

The more commonly available alkylaryl polyether alcohols are derived from octyl or nonyl phenol; i.e. R is octyl or nonyl. These materials commonly have an HLB value of less than about 12. HLB value is the hydrophilic-lipophilic balance as published in "The Atlas HLB-System, a time saving guide to emulsifier selection." Interestingly it has been found that the viscosity of the present aqueous dispersion will drop as the HLB value of the alkyl aryl polyether alcohol increases. Table A contains a list of some of the available alkylaryl polyether alcohols useful in the present invention.

TABLE A

| ALKYLARYL POLYETHER ALCOHOLS | | | |
|---|---|---|---|
| TRADEMARK | HLB | R | n |
| Witconol NP-60 | 10.9 | nonyl | 6 |
| Witconol NP-40 | 8.9 | nonyl | 4 |
| Witconol NP-15 | 4.6 | nonyl | 1.5 |
| IGEPAL CO-210 | 4.6 | nonyl | 1.5 |
| Tergitol NP-4 | 8.9 | nonyl | 4 |
| Tergitol NP-7 | 11.7 | nonyl | 7 |
| Triton X-15 | 3.6 | octyl | 1 |
| Triton X-35 | 7.8 | octyl | 3 |
| Triton N-42 | 9.1 | nonyl | 4 |

WITCONOL is a trademark of Witco Corporation
IGEPAL is a trademark of GAF Corporation
TERGITOL is a trademark of Union Carbide Corp.
TRITON is a trademark of Rohm and Haas Company The oxyalkylated phenolic resin component of the present invention is also an available material. Often the alkoxylation is performed with ethylene and/or propylene oxide. An example of this material is the oxyalkylated oligomer of an alkylphenol and formaldehyde. One such material is sold by Witco Corp. under its trademark Witbreak DRA-22. These oxyalkylated phenolic resin components are typically used as demulsifiers; i.e., to convert emulsions into separate oil and water phases. Surprisingly, in the present invention it has been found that inclusion of such a component provides a stable aqueous dispersion of an organic peroxide, a function not expected in view of the known use of the component as a demulsifier.

In addition to the aforedescribed two components, the dispersing agent of the present aqueous dispersions may also contain other components. Included in the optional components of the present aqueous dispersions is an anionic emulsifier such as disodium (half ester) sulfosuccinate. Such a material is presently sold under the trademark Emcol K-8300 (Witco Corporation).

Another optional component of the dispersing agent is a partial ester of a carboxylic acid copolymer. An example of this material is sold under the trademark DAPRAL GE 202 (Akzo Chemie). It is a water soluble copolymer of 3 monomers:

1) acrylic or methacrylic acid
2) an alkyl ester of acrylic or methacrylic acid having from about 16 to about 18 carbon atoms
3) an alkylene oxide ester of acrylic or methacrylic acid wherein the alkylene group has from about 12 to about 24 carbon atoms.

This component functions as a viscosity reducing agent; i.e., increasing its concentration in the aqueous dispersion lowers the viscosity of the aqueous dispersion.

Another optional component of the aqueous dispersion of this invention is magnesium aluminum silicate. This material functions as a thickening and stablizing agent.

The amount of each component of the dispersing agent of the aqueous dispersion will vary depending upon many factors including but not limited to the identity of the organic peroxide, the amount of organic peroxide in the aqueous dispersion, the desired viscosity of the aqueous dispersion, the intended use of the aqueous dispersion, etc. In general, it is necessary to use an effective dispersing amount of the dispersing agent. For most dispersions an amount of dispersing agent between about 0.8 and about 15 weight percent of the aqueous dispersion will suffice. It is preferred that the amount of dispersing agent be between about 1.8 and about 10.5 percent by weight of the aqueous dispersion.

The amount of each individual component of the dispersion agent will also vary for the reasons previously stated, particularly the identity of the organic peroxide and the desired viscosity of the aqueous dispersion.

In general the components of the dispersing agent can be present in the following amounts:

| Component | Percent By Weight |
|---|---|
| alkyl aryl polyether alcohol | 0.4–3.0 |
| oxyalkylated phenolic resin | 0.4–3 |
| partial ester of a carboxylic acid copolymer | 0.0–5.0 |
| anionic emulsifier | 0–2 |
| thickening agent | 0–2 |

Preferred amounts of the components of the dispersing agents are as follows:

| Component | Percent By Weight |
|---|---|
| alkyl aryl polyether alcohol | 0.4–2.0 |
| oxyalkylated phenolic resin | 0.4–2 |
| partial ester of a carboxylic acid copolymer | 1.0–4.0 |
| anionic emulsifier | 0–1.5 |

-continued

| Component | Percent By Weight |
| --- | --- |
| thickening agent | 0–1 |

Additional components can be present in the dispersing agent without effecting its performance in the aqueous dispersions of the present invention.

The aqueous dispersions of this invention can be prepared by standard procedures for the preparation of dispersions. In general, water is placed into a vessel and heated with stirring to 60° C. Then the thickening agent (e.g. magnesium aluminum silicate), if any, is added slowly with vigorous stirring which is continued for about ten minutes. After the mixture is cooled to room temperature, the remaining components of the dispersing agent are added. This is followed by the addition of the organic peroxide. The stirring is continued for about 30 minutes. The desired dispersion is obtained by passing the mixture through a homogenizer or other suitable mixing device.

It should be apparent that the components of the dispersing agent can be added individually to the aqueous medium.

Some variations of this procedure may be desirable with specific organic peroxides. For example, when the organic peroxide is dicetyl peroxydicarbonate, refrigerated storage of the dispersion is desirable to prevent the viscosity from increasing significantly. Other variations within the skill of the art may be desirable for other specific materials.

In order to demonstrate the preparation and properties of the aqueous dispersions of this invention, the following experiments were performed. Procedure A describes the preparation of Example 18, Table 2, which preparation is representative of that used for the other Examples.

PROCEDURE A

Water (60.7 grams) was placed into a beaker on a hot plate and heated with stirring to 60° C. Then magnesium aluminum silicate (0.8 grams) was added slowly with vigorous stirring. After ten minutes of stirring, the dispersion was cooled to room temperature. Then Dapral GE 202 (2.8 grams), Witconol NP-40 (1.10 grams) and Emcol K8300 (0.5 grams) were added in the listed order. Wetted dicetyl peroxydicarbonate (34.09 grams, 88% pure) was added to the mixture. Finally, the mixture was stirred for 30 minutes and passed through a hand operated homogenizer. The viscosity was measured as 2200 cps. After sitting for several days at room temperature, the viscosity had increased to 3400 cps.

Table 1 contains the results of the preparation and testing of aqueous dispersions of benzoyl peroxide having concentrations ranging from 40 to 42 weight percent; Table 2 contains the results of the preparation and testing of aqueous dispersions of dicetyl peroxy dicarbonate; and Table 3 contains the results of the preparation and testing of various organic peroxides wherein examples 25 and 26 used di(4-t-butylcyclohexyl) peroxydicarbonate; examples 27 and 28 used acetylperoxy stearyl carbonate; examples 29 and 30 used 2, 4-dichlorobenzoyl peroxide and example 31 was performed with lauroyl peroxide. Table 4 contains the results of the preparation and testing of aqueous dispersions of 45–65% benzoyl peroxide.

The determination of the amount of dispersion necessary to cure the unsaturated polyester resin necessarily depends on the content of the aromatic diacyl peroxide in the dispersion. Normally the use of aromatic diacyl peroxide in an amount between about 0.5 to about 5 weight percent of the unsaturated polyester resin will suffice, although it is preferred that the amount be between about 0.5 to about 1.5 weight percent of the resin.

Thus, the amount of dispersion to be used can be between about 0.5 and 5 weight percent of the unsaturated polyester resin; and preferably between about 2 and 3 weight percent of the resin.

In order to demonstrate the usefulness of the dispersions of this invention in the curing of polyester resins, the following experiments were performed. Procedure B contains the general procedure used in the experiments and Table 5 contain the details and results of the experiments.

PROCEDURE B

Resin (50.0 grams) is placed into a 3 oz. cup. The aromatic diacyl peroxide dispersion is added in an amount calculated to contain 0.4 or 0.5 grams of aromatic diacyl peroxide and mixed by hand for one minute. Then a temperature probe is placed in the middle of the cup and a spatula is used to "pick" the surface of the resin. When the resin gels, the time and temperature are recorded. As the resin begins to cure, the temperature is recorded every 15 seconds to determine the peak exotherm time and temperature.

TABLE 1

| | Benzoyl Peroxide (BPO) Dispersions | | | | | | | | | |
| | % by Weight | | | | | | | | | |
| Example | Water (Total) | Dapral GE202 | Witbreak DRA-22 | Witconol NP40 | Emcol K8300 | Magnabrite HV | BPO | Viscosity (cps) | Stability r.t. | 40° C. |
| --- | --- | --- | --- | --- | --- | --- | --- | --- | --- | --- |
| 1 | 54.35 | 3.0 | 1.3 | 0.85 | 0.5 | — | 40.0 | 500 | 3 months | 1 month |
| 2 | 54.35 | 3.0 | 1.3 | 0.85* | 0.5 | — | 40.0 | 1500 | 1 month | — |
| 3 | 54.35 | 3.0 | 1.3 | 0.85** | 0.5 | — | 40.0 | 5000 | 4 months | — |
| 4 | 53.95 | 3.0 | 1.3 | 1.25 | 0.5 | — | 40.0 | 200 | 3 months | 1 month |
| 5 | 53.50 | 3.0 | 1.3 | 1.7 | 0.5 | — | 40.0 | 3600 | 1½ months | — |
| 6 | 54.00 | 3.0 | 1.3 | 1.7 | — | — | 40.0 | 4400 | 6 months | — |
| 7 | 55.00 | 1.5 | 1.3 | 1.7 | 0.5 | — | 40.0 | 6400 | 6 months | — |
| 8 | 56.00 | 0.5 | 1.3 | 1.7 | 0.5 | — | 40.0 | 10000 | 5 months | — |
| 9 | 52.3 | 3.0 | 1.3 | 1.0 | 0.5 | — | 41.9 | 600 | 3 months | — |
| 10 | 54.0 | 2.0 | 1.3 | 1.0 | 0.5 | 0.5 | 40.7 | 300 | 4 months | — |
| 11 | 55.5 | 2.0 | 0.4 | 1.0 | 0.5 | 0.5 | 40.1 | 400 | 3 months | — |
| 12 | 53.5 | 3.0 | — | — | 0.7 | 0.8 | 42.0 | 340 | <1 week | — |
| 13 | 53.8 | 3.0 | 0.8 | — | 0.6 | 0.8 | 41.0 | 640 | <1 week | — |
| 14 | 54.7 | 2.8 | — | 1.1 | 0.5 | 0.8 | 40.1 | 400 | 3¼ months | — |

TABLE 1-continued

Benzoyl Peroxide (BPO) Dispersions

| | % by Weight | | | | | | | Stability | |
|---|---|---|---|---|---|---|---|---|---|
| Example | Water (Total) | Dapral GE202 | Witbreak DRA-22 | Witconol NP40 | Emcol K8300 | Magnabrite HV | BPO | Viscosity (cps) | r.t. | 40° C. |
| 15 | 54.35 | 3.0 | 1.3 | 0.85*** | 0.5 | — | 40.0 | 1200 | 4 months | — |

*Witconol NP-15
**Triton X-15
***IGEPAL CO-210

TABLE 2

Dicetyl Peroxydicarbonate Dispersions

| | % by Weight | | | | | | | Initial Viscosity (cps) | Viscosity After One Week (cps) | Stability at 5° C. |
|---|---|---|---|---|---|---|---|---|---|---|
| Example | Water (Total) | Dapral GE202 | Witbreak DRA-22 | Witconol NP-40 | Emcol K8300 | Magnabrite HV | Peroxide | | | |
| 16 | 64.35 | 3.00 | 1.30 | 0.85 | 0.50 | — | 30.00 | 8,000 | 200 | 3 months |
| 17 | 67.18 | 1.50 | 0.65 | 0.42 | 0.25 | — | 30.00 | 6,000 | 100 | 3 months |
| 18 | 64.80 | 2.80 | — | 1.10 | 0.5 | 0.8 | 30.00 | 2,200 | 3,400 | 1 month |
| 19 | 65.65 | 3.00 | — | 0.85 | 0.5 | — | 30.00 | 2,200 | 500 | 1 month |
| 20 | 54.35 | 3.00 | 1.30 | 0.85 | 0.50 | — | 40.00 | >20,000 | >20,000 | 3 months |
| 21 | 57.18 | 1.50 | 0.65 | 0.42 | 0.25 | — | 40.00 | >20,000 | >20,000 | 2½ months |
| 22 | 63.55 | 3.00 | 1.3 | 0.85* | 0.5 | 0.8 | 30.00 | >20,000 | 6,000 | >5 month |
| 23 | 63.55 | 3.00 | 1.3 | 0.85** | 0.5 | 0.8 | 30.00 | 13,000 | 1,800 | >5 months |
| 24 | 55.78 | — | 0.8 | 1.50*** | 1.0 | 0.35**** | 40.57 | 380 | 1,000 | >3 weeks (at 25° C.) |

*IGEPAL CO-210
**Triton N-42
***Witconol NP-60
****Magnabrite Standard Grade

TABLE 3

Dispersions of Several Different Peroxides

| | % by Weight | | | | | | | Initial Viscosity (cps) | Viscosity After One Week (cps) | Stability at 5° C. |
|---|---|---|---|---|---|---|---|---|---|---|
| Example | Water (Total) | Dapral GE202 | Witbreak DRA-22 | Witconol NP-40 | Emcol K8300 | Magnabrite HV | Peroxide | | | |
| Di (4-t-butylcyclohexyl) Peroxydicarbonate | | | | | | | | | | |
| 25 | 64.35 | 3.00 | 1.30 | 0.85 | 0.50 | — | 30.00 | 400 | 100 | 1 months |
| 26 | 54.35 | 3.00 | 1.30 | 0.85 | 0.50 | — | 40.00 | 1,200 | 600 | 4 months |
| Acetylperoxy Stearyl Carbonate | | | | | | | | | | |
| 27 | 64.35 | 3.00 | 1.30 | 0.85 | 0.50 | — | 30.00 | 6,400 | — | 1 week |
| 28 | 54.35 | 3.00 | 1.30 | 0.85 | 0.50 | — | 40.00 | >20,000 | — | 1 week |
| 2,4-Dichlorobenzoyl Peroxide | | | | | | | | | | |
| 29 | 64.35 | 3.00 | 1.30 | 0.85 | 0.50 | — | 30.00 | 2,000 | — | 1 week |
| 30 | 54.35 | 3.00 | 1.30 | 0.85 | 0.50 | — | 40.00 | >20,000 | >20,000 | 1 month |
| Lauroyl Peroxide | | | | | | | | | | |
| 31 | 54.13 | 2.87 | — | 1.10 | 0.50 | 0.80 | 40.60 | 5,800 | 4,400 | >6 months (at 25° C.) |

TABLE 4

45-65% Benzoyl Peroxide Dispersions

| | % by Weight | | | | | | | Initial Viscosity (cps) | Later Viscosity (cps) | Stability | |
|---|---|---|---|---|---|---|---|---|---|---|---|
| Example | Water (Total) | Dapral GE202 | Witbreak DRA-22 | Witconol NP-40 | Emcol K8300 | Magnabrite HV | BPO | | | Room Temp. | 40° C. |
| 32 | 43.50 | 3.0 | 1.3 | 1.7 | 0.5 | — | 50.0 | 12,800 | 5,500 (1 week) | >5 Months | 1 month |
| 33 | 44.80 | 3.0 | — | 1.7 | 0.5 | — | 50.0 | 60,000 | — | >5 Months | — |
| 34 | 49.7 | 2.0 | 0.6 | 1.0 | 0.5 | 0.5 | 45.7 | 500 | 2,500 (7 weeks) | 3¼ Months | — |
| 35 | 44.9 | 2.0 | 0.4 | 1.0 | 0.5 | 0.5 | 50.7 | 4,200 | >10,000 (7 weeks) | >3 Months | — |
| 36 | 47.49 | — | 0.83 | 1.50* | 1.0 | 0.33** | 48.85 | 300 | 600 (2 weeks) | >3 weeks | — |
| 37 | 34.59 | — | 0.50 | 1.50* | 1.17 | 0.33** | 61.91 | 2,900 | 7,000 (1 week) | >2 weeks | — |

*Witconol NP-60
**Magnabrite Standard Grade

TABLE 5

Room Temperature (69° F.) Gel Tests Using Benzoyl Peroxide Dispersions

| Example | Dispersion Used | Resin Used | Concentration of Dispersion In Resin (%) | Net % BPO in Resin | Gel Time, Minutes | Exotherm Time, Minutes | Peak Temperature (°F.) |
|---|---|---|---|---|---|---|---|
| 38 | Example 9, Table 1 | Cargill 8292 | 2.5 | 1.0 | 10.5 | 20.75 | 312 |
| 39 | Example 14, Table 1 | " | 2.5 | 1.0 | 11.35 | 21.5 | 305 |
| 40 | Footnote 1 | " | 1.82 | 1.0 | 13.5 | 23.5 | 317 |
| 41 | Footnote 2 | " | 2.5 | 1.0 | 13.25 | 24.0 | 329 |
| 42 | Example 14, Table 1 | Cargill 8296 | 2.0 | 0.8 | 20.0 | 41.75 | 295 |
| 43 | Example 14, Table 1 | " | 2.5 | 1.0 | 16.0 | 34.25 | 320 |
| 44 | Footnote 2 | " | 2.0 | 0.8 | 23.75 | 45.5 | 306 |
| 45 | Footnote 2 | " | 2.5 | 1.0 | 19.0 | 38.75 | 328 |

1. Benzoyl peroxide paste, BZQ-55, 55% in butyl benzyl phthalate.
2. Benzoyl peroxide suspension, BZQ-40, 40% in butyl benzyl phthalate.

In order to determine the usefulness of the dispersions of this invention in the polymerization of vinyl monomers, the following experiments were performed. Procedure C contains the general procedure used in the experiments and Table 6 contains the details of the experiments and the results thereof.

PROCEDURE C

The suspension polymerization of vinyl chloride was performed in pop bottles using uninhibited vinyl chloride. Duplicate experiments were performed and analyzed for each polymerization. The bottles were capped after the desired reactants had been added and the contents of the bottles almost melted. Then the bottles were placed in a rotating constant temperature bath at 55° C. for 5.5 hours. The bottles were then frozen. Excess vinyl chloride was vented from the bottles. Then the polymer was filtered, washed and dried. Examples 46–48 used dicetyl peroxydicarbonate dispersions as the initiator with Example 49 being a control using solid initiator. Example 50 used di (4-t-butylcyclohexyl) peroxydicarbonate dispersion as the initiator with Example 51 being a control using the initiator dissolved in toluene. Table 6 contains the results of the experiments.

vention contemplates the incorporation of the previously described aqueous dispersions into vinyl monomers to improve the polymerization of the vinyl monomer.

It will be apparent to those of ordinary skill in this art that certain modification can be made in the present invention without departing from the spirit and scope thereof.

We claim:

1. An aqueous dispersion consisting of about 10 to about 65 percent by weight of an organic peroxide which is solid at about 20° C.; an effective dispersing amount of a dispersing agent consisting essentially of an alkyl aryl polyether alcohol; an oxylated phenolic resin; from 0 to about 5 percent by weight of a partial ester of a carboxylated acid copolyer; from 0 to about 1 percent by weight of a thickening agent; from 0 to about 1.5 percent by weight of anionic emulsifier and the remainder water.

2. The aqueous dispersion of claim 1 wherein the organic peroxide is selected from the group consisting of benzoyl peroxide, dicetyl peroxy carbonate, di(4-t-butylcyclohexyl) peroxydicarbonate, lauroyl peroxide, acetyl peroxy stearyl carbonate and 2,4-dichlorobenzoyl peroxide.

TABLE 6

Polymerization of Vinyl Chloride to PVC with Peroxydicarbonate Dispersions

| Example | Dispersion Used | % Weight Initiator Used* | Moles ($\times 10^{-4}$) Initiator per 100 grams Monomer* | % Conversion after 5.5 Hours at 55° C. |
|---|---|---|---|---|
| | Dicetyl Peroxydicarbonate | | | |
| 46 | Example 16, Table 2 | 0.085 | 1.49 | 87.1 |
| 47 | Example 18, Table 2 | " | " | 87.1 |
| 48 | Example 19, Table 2 | " | " | 87.4 |
| 49 | Control, solid | " | " | 89.3 |
| | Di(4-t-butylcyclohexyl) Peroxydicarbonate | | | |
| 50 | Example 25, Table 3 | 0.058 | 1.46 | 83.6 |
| 51 | Control, initiator dissolved in toluene | " | " | 73.1 |

*All initiator concentrations shown have been corrected for purity

Other vinyl monomers that can be polymerized by the present method include styrene, vinyl toluene, a-methyl styrene, chlorostyrene, t-butyl styrene, methyl methacrylate, ethyl methacrylate, vinyl acetate, diallyl phthalate and triallyl cyanurate. Thus, the present in- 3. The aqueous dispersion of claim 1 wherein the organic peroxide is benzoyl peroxide.

4. The aqueous dispersion of claim 1 wherein the organic peroxide is dicetyl peroxy dicarbonate.

5. The aqueous dispersion of claim 1 wherein the organic peroxide is di(4-t-butylcyclohexyl) peroxy dicarbonate.

6. The aqueous dispersion of claim 1 wherein the organic peroxide is lauroyl peroxide.

7. The aqueous dispersion of claim 1 wherein the organic peroxide is acetyl peroxy stearyl carbonate.

8. The aqueous dispersion of claim 1 wherein the organic peroxide is 2,4-dichlorobenzoyl peroxide.

9. The aqueous dispersion of claim 1 wherein the alkylaryl polyether alcohol has the structural formula:

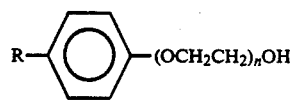

wherein R is alkyl of from about 6 to about 12 carbon atoms and n is a number from 1 to about 12.

10. The aqueous dispersion of claim 9 wherein R is octyl or nonyl.

11. The aqueous dispersion comprising from about 10 to about 65 percent by weight of an organic peroxide which is solid at about 20° C.; an effective dispersing amount of a dispersing agent comprising an alkylaryl polyether alcohol and an oxyalkylated oligomer of an alkylphenol and formaldehyde and the remainder water.

12. The aqueous dispersion of claim 11 wherein the oxyalkylated phenolic resin is oxyalkylated with ethylene oxide and propylene oxide.

13. The aqueous dispersion of claim 1 wherein the partial ester of a carboxylic acid copolymer is a copolymer of 1) acrylic or methacrylic acid, 2) an alkyl ester of acrylic or methacrylic acid having from about 16 to about 18 carbon atoms and 3) an alkylene oxide ester of acrylic or methacrylic acid wherein the alkylene group has from about 12 to about 24 carbon atoms.

14. The aqueous dispersion of claim 1 wherein the oxyalkylated phenolic resin is an oxyalkylated oligomer of an alkylphenol and formaldehyde and the alkylaryl polyether alcohol has the structural formula:

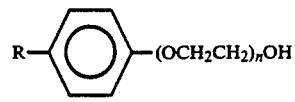

wherein n is alkyl of from about 6 to 12 carbon atoms and n is a number from 1 to about 12.

15. The aqueous dispersion of claim 1 wherein the dispersing agent is present in an amount between about 0.8 and about 15 percent weight of the aqueous dispersion.

16. The aqueous dispersion of claim 1 wherein the thickening agent is magnesium aluminum silicate.

17. The aqueous dispersion of claim 1 wherein the dispersing agent is present in an amount between about 0.8 and about 15 percent weight of the aqueous dispersion.

18. The aqueous dispersion of claim 1 wherein the alkylaryl polyester alcohol is present in an amount between about 0.4 and about 2 weight percent of the aqueous dispersion.

19. The aqueous dispersion of claim 1 wherein the oxyalkylated phenolic resin is present in an amount between about 0.25 and about 2 weight percent of an aqueous dispersion.

20. The aqueous dispersion of claim 16 which also contains up to about 1 weight percent of a thickening agent.

21. The aqueous dispersion of claim 1 wherein the thickening agent is magnesium aluminum silicate.

22. The aqueous dispersion of claim 1 wherein the anionic emulsifier is disodium (half ester) sulfosuccinate.

* * * * *